June 24, 1952 B. D. COLOMBO 2,601,591
SOIL PENETRATING ROLLER
Filed April 5, 1947
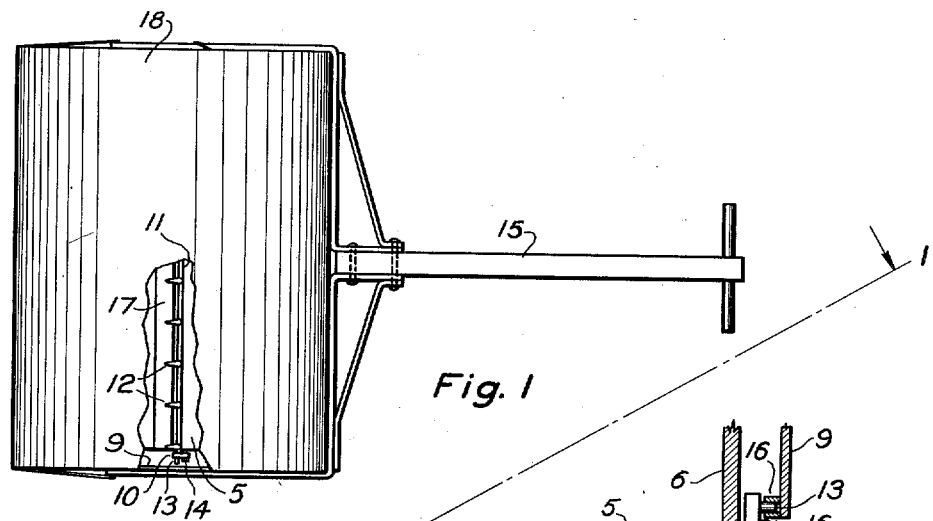
Fig. 1
Fig. 3
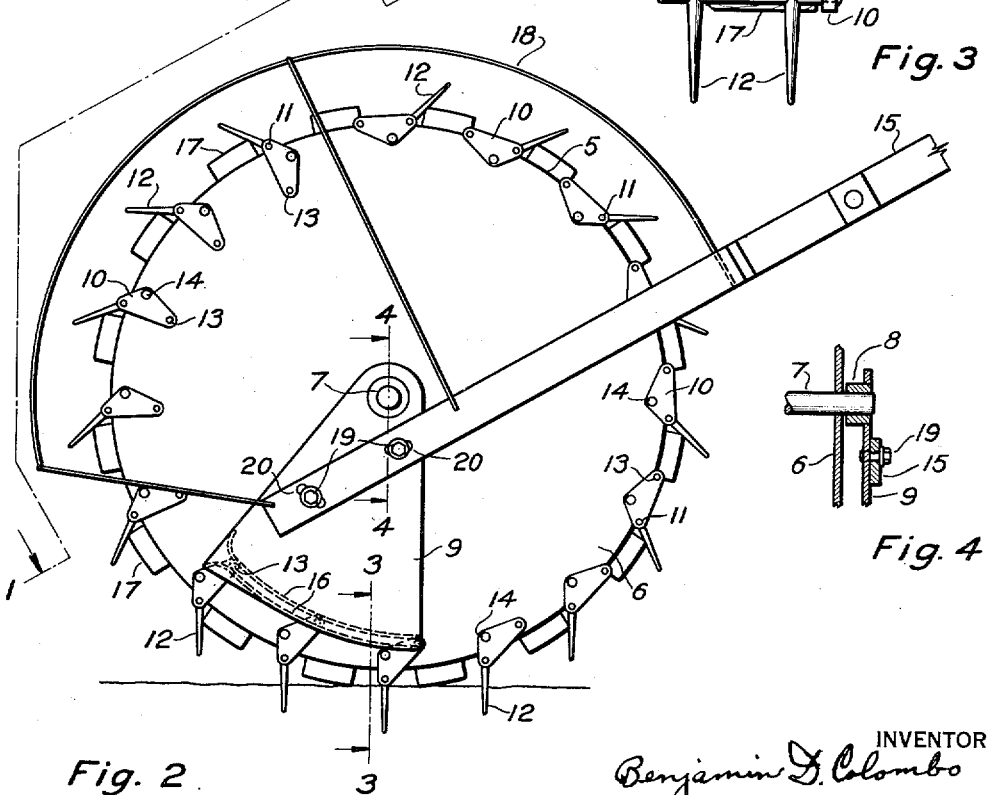
Fig. 2
Fig. 4
INVENTOR
Benjamin D. Colombo
BY
Harry G. Schroeder
ATTORNEY Patented June 24, 1952

2,601,591

UNITED STATES PATENT OFFICE 2,601,591

SOIL PENETRATING ROLLER

Benjamin D. Colombo, Oakland, Calif., assignor of forty-nine one hundredths to Herbert F. Erickson, San Leandro, Calif.

Application April 5, 1947, Serial No. 739,696

2 Claims. (Cl. 97—52)

This invention relates to agricultural equipment and has for its principal object the provision of a lawn renovator which can be operated without marring or tearing the surface of the lawn on which it is used.

Ordinarily, when fertilizer is scattered over the surface of a lawn, and then the lawn is wetted down, much of the fertilizer is washed away and wasted, and that portion which does reach the roots of the grass is so unevenly distributed and otherwise inadequate, that the results are far from satisfactory.

The object of my invention is to provide a device whereby the entire surface of a lawn can be prepared, for the application of fertilizer, by driving holes in serried relation into the soil, a sufficient distance to allow the fertilizer to penetrate to the roots of the grass.

A further object of the invention is the provision of a device that will drive holes straight down into the soil, and which is adapted to withdraw the driving means without any mutilation of the lawn surface taking place.

I accomplish the above objects by the device, a preferred embodiment of which is described herein, and which is illustrated in the accompanying drawing forming a part hereof.

Figure 1 is a plan view as seen from line 1—1 of Figure 2, part of the guard being broken away.

Figure 2 is an end elevation, enlarged with reference to Figure 1.

Figure 3 is an enlarged fragmentary section taken on line 3—3 of Figure 2.

Figure 4 is a fragmentary section taken on line 4—4 of Figure 2.

Referring to the drawing in detail, a hollow cylindrical roller 5, with end plates 6, has a shaft 7 coincident with the longitudinal axis thereof, and projecting a sufficient distance, at either end, in order to form a journal for the boss 8 of a cam plate 9.

The entire structure is symmetrical about a median line passing through the transverse central plane of the roller, any descriptive matter, therefore, referring to an element in the singular form on one end of the roller will also be applicable to the other end.

Pivotally mounted on the end plate 6 adjacent the circumference thereof and in concentric peripheral relationship therewith, are a plurality of plates 10 which are fixedly connected in oppositely matching pairs by rods 11. The rods 11 are equipped with ground piercing prongs 12 spaced along the length thereof, and adapted to project into the soil as indicated on Figure 2.

Each plate 10 has, mounted on its inner free end, an outwardly projecting pin 13 which is in offset relationship relative to a line intersecting the center of the rod 11 and the pivot point 14.

The cam plate 9, mounted on shaft 7, and maintained in spaced relationship relative to plate 6 by boss 8, and a conventionally formed bifurcated handle 15, has a track formed by bars 16 projecting inwardly and spaced apart a distance sufficient to loosely accommodate pins 13 in sliding relation. Bars 16 are parallel for the greater part of their length, but diverge at the front end to form an easy entrance for pins 13. The track formed by bars 16 is of arcuate route, and is so located and of such a radius as to maintain each row of prongs 12 in a vertical position, while its corresponding pin 13 is passing through between the bars 16. The arc through which the plates 10 can pivot is limited by the bar 11 contacting the surface of the roller 5 and the plates are shown in one extreme position on the handle side of the roller, on Figure 2. After they pass over the top center and begin to descend on the other side, the weight of the prongs 12 causes them to fall into the other extreme position, and when a pin 13 reaches the entrance point between bars 16, it is in alignment therewith.

The bars 11 and plates 10 are maintained clear of the ground by treads 17, of wood or other suitable material, secured to the roller 5 between the said bars.

The handle 15, which carries a guard 18, is adjustably mounted on the cam plates 9 by means of screws 19 passing through elongated arcuate slots 20 and engaging tapped holes in the plates 9. The slots 20 are concentric relative to the axis of the roller 5, adjustment of the handle 15, therefore, will not disturb the location of the guard 18 relative to the roller.

The roller 5 can be weighted as desired by introducing sand, concrete, water or other matter into the interior thereof.

From the foregoing it will be apparent that, in the normal operating position with the handle adjusted to suit the height of the operator, the prongs will always enter the ground in a vertical position, and will be withdrawn in like manner due to the action of the cam plate engaging the pins 13 and the pivotal mounting of the prong carrying bars respectively.

While I have disclosed a preferred embodiment of my device, it will be understood that modifications may be made within the spirit and scope of the appended claims.

I claim:

1. A machine for making straight holes in a lawn or other ground, comprising a roller, a plurality of circumferentially spaced rods around the roller, ground piercing members extended from each rod, rockable supports for the rods on the roller, a cam device non-rotatably carried with said roller in predetermined relation between the ground and the axis of the roller and extending to about the line of the vertical diameter of the roller, a cam follower on said rockable support engaging said cam device during the ground piercing positions of said piercing members substantially perpendicular with respect to said ground and being disengaged from said cam device at said vertical line.

2. A machine for making straight holes in a lawn or other ground, comprising a roller, a plurality of circumferentially spaced rods around the roller, ground piercing members extended from each rod, rockable supports for the rods on the roller, a cam device non-rotatably carried with said roller in predetermined relation between the ground and this axis of the roller and extending to about the line of the vertical diameter of the roller, a cam follower on said rockable support engaging said cam device during the ground piercing positions of said piercing members for holding said piercing members substantially perpendicular with respect to said ground and being disengaged from said cam device at said vertical line, said rockable supports comprising a pair of opposed pivoted bracket plates secured to the opposite ends of each rod and pivoted to said roller.

BENJAMIN D. COLOMBO.

REFERENCES CITED

The following references are of record in the file of this patent:

UNITED STATES PATENTS

| Number | Name | Date |
| --- | --- | --- |
| 154,168 | Bleecher | Aug. 18, 1874 |
| 911,417 | Maley | Feb. 2, 1909 |
| 1,162,902 | Colleys | Dec. 7, 1915 |
| 1,704,986 | Marcy | Mar. 12, 1929 |
| 2,042,597 | Hargreaves | June 2, 1936 |
| 2,139,306 | Gaffney | Dec. 6, 1938 |
| 2,193,779 | Ramsden | Mar. 12, 1940 |
| 2,487,158 | Mason | Nov. 8, 1949 |